(12) United States Patent
Kerrigan et al.

(10) Patent No.: US 11,251,616 B2
(45) Date of Patent: Feb. 15, 2022

(54) METHOD AND SYSTEM FOR MANAGING POWER GRID STABILITY UTILISING LOCAL DYNAMIC LOAD CONTROL

(71) Applicant: SELC Ireland Ltd, Dublin (IE)

(72) Inventors: William John Kerrigan, Johnstown (IE); Frank Magee, Trim (IE); Pat Gayer, Fermoy (IE)

(73) Assignee: SELC Ireland Ltd.

( * ) Notice: Subject to any disclaimer, the term of this patent is extended or adjusted under 35 U.S.C. 154(b) by 208 days.

(21) Appl. No.: 16/625,056

(22) PCT Filed: Jun. 20, 2018

(86) PCT No.: PCT/EP2018/066468
§ 371 (c)(1),
(2) Date: Dec. 20, 2019

(87) PCT Pub. No.: WO2018/234402
PCT Pub. Date: Dec. 27, 2018

(65) Prior Publication Data
US 2020/0153244 A1    May 14, 2020

(30) Foreign Application Priority Data

Jun. 23, 2017 (GB) .................................... 1710090

(51) Int. Cl.
*H02J 3/12* (2006.01)
*H02J 3/24* (2006.01)
(Continued)

(52) U.S. Cl.
CPC ................ *H02J 3/12* (2013.01); *G05B 15/02* (2013.01); *H02J 3/24* (2013.01); *H02J 13/00002* (2020.01); *H02J 2203/20* (2020.01)

(58) Field of Classification Search
CPC .......... H02J 3/12; H02J 13/00002; H02J 3/24; H02J 2203/20; H02J 13/0006; H02J 3/381;
(Continued)

(56) References Cited

U.S. PATENT DOCUMENTS 8,340,832 B1 * 12/2012 Nacke .................... G05B 15/02
700/295
10,678,198 B2 * 6/2020 Burstall .................. H02J 13/00
(Continued)

FOREIGN PATENT DOCUMENTS

EP        3007295 A1    4/2016
WO    2013010266 A1    1/2013
(Continued)

OTHER PUBLICATIONS

Cheng et al., "Benefits of using virtual energy storage system for power system frequency response", Mar. 31, 2016, Applied Energy 194 (2017) 376-385. (Year: 2016).*

(Continued)

*Primary Examiner* — Mohammad Ali
*Assistant Examiner* — Kelvin Booker
(74) *Attorney, Agent, or Firm* — Lee & Hayes, P.C.

(57) ABSTRACT

Provided are a method and system for managing power grid stability utilising local dynamic load control, the method being performed by a virtual load manager (VLM) comprising one or more processors configured to: configure a plurality of electrical devices connected to a mains supply grid to individually react to grid fluctuations such that the plurality of electrical devices act as one or more virtual load groups each comprising one or more electrical devices with the same response to the grid fluctuations; and manage the individual electrical devices and operating characteristics of the electrical devices in the one or more virtual load groups (Continued)

on behalf of a central grid controller (CGC) of the mains supply grid, wherein each of the electrical devices comprises a local controller configured to provide dynamic control of their respective load in response to fluctuations of the mains supply grid based on the configuration provided by the virtual load manager (VLM).

25 Claims, 7 Drawing Sheets

(51) Int. Cl.
    *G05B 15/02*     (2006.01)
    *H02J 13/00*     (2006.01)

(58) Field of Classification Search
    CPC . H02J 3/18; G05B 15/02; Y02E 60/00; Y02E 40/70; Y02E 40/30; Y02B 70/30; Y04S 20/242; Y04S 40/20; Y04S 10/12; Y04S 10/22

See application file for complete search history.

(56) References Cited

U.S. PATENT DOCUMENTS

| | | | |
|---|---|---|---|
| 2011/0106321 A1* | 5/2011 | Cherian | H02J 13/00002 700/286 |
| 2011/0133655 A1* | 6/2011 | Recker | H05B 47/16 315/159 |
| 2011/0138198 A1 | 6/2011 | Boss et al. | |
| 2011/0172837 A1* | 7/2011 | Forbes, Jr. | H02J 3/14 700/291 |
| 2011/0245987 A1* | 10/2011 | Pratt | B60L 53/16 700/295 |
| 2012/0080944 A1* | 4/2012 | Recker | H05B 47/11 307/25 |
| 2012/0316691 A1* | 12/2012 | Boardman | H02J 3/26 700/293 |
| 2013/0123998 A1* | 5/2013 | King | G06F 1/30 700/292 |
| 2013/0184894 A1 | 7/2013 | Sakuma | |
| 2014/0214227 A1* | 7/2014 | Thornton | H02J 3/00 700/295 |
| 2014/0288674 A1 | 9/2014 | Ogawa et al. | |
| 2015/0280436 A1 | 10/2015 | Weckx et al. | |
| 2015/0295402 A1 | 10/2015 | Black | |

FOREIGN PATENT DOCUMENTS

| | | |
|---|---|---|
| WO | 2014/089463 A2 | 6/2014 |
| WO | 2015/058279 A1 | 4/2015 |

OTHER PUBLICATIONS

Noha et al., "Early Detection of Voltage Instability in Distribution System utilizing Phasor Measurement Units", International Conference on Renewable Energies and Power Quality (ICREPQ'10) Granada (Spain), Mar. 23-25, 2010. (Year: 2010).*

International Search Report and Written Opinion for PCT/EP2018/066468, dated Aug. 22, 2018.

UK Search and Examination Report for GB1710090.0, dated Dec. 20, 2017.

* cited by examiner

METHOD AND SYSTEM FOR MANAGING POWER GRID STABILITY UTILISING LOCAL DYNAMIC LOAD CONTROL

FIELD

The present disclosure relates to managing the power requirements for electrical devices on an electrical grid, and more particularly to a method and system for improving power grid stability utilising local dynamic load control on discrete loads acting independently.

BACKGROUND OF THE INVENTION

With the current growth of renewable energy sources connected to power grids, there are challenges in the maintenance of grid stability. The reason for this is that for the most part, renewable energy sources, such as wind, solar, etc. are highly variable, as sudden changes in wind or cloud cover can drastically affect the output power from these sources. As a result, high speed generators are needed to rapidly increase or decrease power to the grid to provide compensation for the variation in output of the renewable sources. These high speed generators are expensive and are not very efficient. As an alternative to supply compensation for management of the grid stability, adjusting the load on the grid provides an equally effective solution.

One of the main methods used to determine the state of the power grid is the measurement of the grid frequency. When the grid is overloaded the grid frequency drops below nominal and if there is an oversupply situation the grid frequency rises above nominal.

As an example, power grid frequency may be measured remotely from electrical load devices by a remote grid controller unit which makes a decision on the requirements for the load on the grid based on the current grid state. Then a central control unit calculates the new load requirement and a power on or off message is dispatched to the individual electrical load devices. Using this method, dynamic load control is difficult as each individual load is either on or off and as the number of load devices increases central control becomes unmanageable. Furthermore this method can be modified to allow intermediate systems to aggregate different load devices into groups so as to allow stepped power adjustments to be provided with the minimum power step being the difference in power between the on and off consumption of the smallest load device in the group. Even with improvements in the load device control, delays due to transmission time from the remote central measurement and load control unit relative to the actual load device results in a poor and imprecise level of power control over the grid. Also, conditions at the load device and the remote frequency monitoring point can be dissimilar unless the system is designed to ensure that the centralised grid monitoring and control is representative of the conditions at the individual load circuits.

For example, the load devices may be streetlights. On most installations of streetlights the actual electricity supply connections are historical and not connected to a common lighting grid. Streetlights fitted over a whole city may be connected to the electricity supply through different grid circuits. Many of these circuits may be supplied from different sub stations which may require different dynamic load response profiles to that of the grid as a whole.

Large dynamic loads such as large water heating units 3000-9000 W, or larger heating loads such as 3500 W storage heaters can be managed directly from the grid. These larger loads are each significant in their own right and are normally controlled directly or indirectly from a central grid controller (CGC) having grid management and administration functionality, though the requirement for a low latency guaranteed communication path between the controlling unit and the actual load must be satisfied. It is not efficient for the central grid controller (CGC) to connect to each of a plurality of individual small loads and control each in real time so that the grid can be managed effectively. The technical challenges and cost overhead required to provide a high speed connection from the (CGC) to each small load are too high.

In view of the above, there is a need for a solution that provides for management of a plurality of relatively low power consumption (<3000 W) devices connected to an electrical grid.

SUMMARY

According to the present disclosure there is provided a method as detailed in claim 1. Also provided is a system in accordance with claim 23. Advantageous features are provided in the dependent claims.

The present disclosure utilises a local controller in an electrical device to measure accurately mains grid fluctuations and identify where the grid is entering an area of instability. The local controller contains preconfigured settings to define the type and level of the grid fluctuations it reacts to. The local controller defines limits that ensure predictable changes in the power demand on the electrical device in response to the grid fluctuation measured. The configuration settings on each device can be read and written by a virtual load manager (VLM) so that the action of each electrical device can be predicted and modified if required to comply with the requirements of a central grid controller (CGC). The power consumed by the device may be self-adjusted to help return the power grid to a stable state.

An example of the configuration parameters that are required on the electrical device to allow it to operate independently to correct for fluctuations in the grid are as follows.

Normal operating Frequency Band (e.g. 49.90 Hz<F<50.10 Hz)

Normal operating Voltage Band (e.g. 225V<VAC<235V)

Voltage Error Band 1 High Limits: (e.g. 235V<VAC<245V)

Voltage Error Band 1 Low Limits: (e.g. 215V<VAC<225V)

Freq Error Band 1 High Limits (e.g. 50.10 Hz<F<50.20 Hz)

Freq Error Band 1 Low Limits (e.g. 49.80 Hz<F<49.90 Hz)

Freq Error Band 2 High Limits (e.g. 50.20 Hz<F<50.30 Hz)

Freq Error Band 2 Low Limits (e.g. 49.70 Hz<F<49.80 Hz)

Freq Error Band 4 Low Limits (e.g. 48.00 Hz<F<49.00 Hz)

Freq Error Band 1 High delay before Acting: 2.00 Seconds

Freq Error Band 2 High delay before Acting: 1.00 Seconds

Freq Error Band 3 High delay before Acting: 0.50 Seconds

Freq Error Band 3 Low delay before Acting: 0.30 Seconds

Freq Error Band 4 Low delay before Acting: 0.10 Seconds

Freq Error Band 1 High dynamic load increase action:

increase at 10 Watt/Sec
Freq Error Band 2 Low dynamic load reduce action: reduce at 20 Watt/Sec
Freq Error Band 4 Low dynamic load reduce action: reduce at 100 Watt/Sec The present disclosure provides a software management system, in the form of a virtual load manager (VLM) configured to calculate and administer configurations to individual electrical devices that support dynamic load control. This allows multiple individual loads on single devices to be configured centrally to react independently though in an identical fashion so that collectively they act as a larger single virtual load on the grid network.

Accordingly, the present disclosure allows for practical management of large quantities of individually small dynamic loads acting independently for power grid stability management.

BRIEF DESCRIPTION OF THE DRAWINGS

The present application will now be described with reference to the accompanying drawings in which.

DETAILED DESCRIPTION OF THE DRAWINGS

The present disclosure utilises a software algorithm in a local controller of an electrical device to use data from accurate measurements of the power grid frequency and/or voltage. Accordingly, it can be identified when the grid is entering an area of instability by comparing the measured frequency/voltage levels against limit levels defined by the configurations set by a virtual load manager (VLM) based on the requirements of a central grid controller (CGC). The algorithm may be configured to adjust the power consumed by the electrical device comprising the local controller to help return the power grid to a stable state.

One of the challenges with this method is that if the power demand on the grid is adjusted by many devices independently then the end result will be that the grid will be out of control.

The present disclosure provides a method for power grid stability management utilising local dynamic load control, the method being performed by a virtual load manager (VLM) comprising one or more processors configured to: configure a plurality of electrical devices connected to a mains supply grid to individually react to grid fluctuations such that the plurality of electrical devices act as one or more virtual load groups each comprising one or more electrical devices with the same response to the grid fluctuations; and manage the individual electrical devices and operating characteristics of the electrical devices in the one or more virtual load groups on behalf of a central grid controller (CGC) of the mains supply grid, wherein each of the electrical devices comprises a local controller configured to provide dynamic control of their respective load in response to fluctuations of the mains supply grid based on the configuration provided by the virtual load manager (VLM).

The CGC may be configured to have virtual load management and administration functionality.

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The present disclosure utilises the fact that electrical devices such as streetlights can be individually configured to provide dynamic control of their respective load in response to fluctuations of the mains supply grid. Fluctuations of the mains supply grid may be at least one of frequency fluctuations and voltage fluctuations. The nominal load power of a streetlight is in the range of 50 W to 300 W. As is known, it is possible to communicate with each individual electrical device from a CGC of a mains supply grid and to individually control load level on a device by device basis. However, the value of this large amount of administration is low as the average load on a streetlight is in the order of 100 W.

According to an embodiment of the present disclosure, therefore, a virtual load manager (VLM) outside the CGC is provided that allows individual devices to be managed so that they collectively act as a single dynamic load. The VLM can be considered as an intermediate layer of management and administration software outside the CGC that allows the devices to be managed collectively and act (though operating independently) as a single dynamic load. The proposed solution allows for the configuration of one or more individual devices to act as a virtual group so that the total load and operating characteristics can be managed on behalf of the CGC of the mains supply grid. For example, a collection of 100 units of 100 W streetlights configured to react in the same way to disturbances or fluctuations on the grid effectively acts as a single virtual controllable group to the CGC and will appear to the CGC as a single 10,000 W dynamic load. This allows practical use of individually controllable streetlights for dynamic grid control. In this manner, management of virtual load groups can provide an effective solution for maintaining stability of the grid instead of providing a solution that entails supply compensation for management of the grid stability.

The basic requirements for a local controller for each individual electrical device according to the present disclosure to operate successfully are as follows.

to be configured for two-way communications to allow updates from the VLM, to adjust the configuration data for a rate or rates at which the device is allowed to increase or decrease the power demand from the grid and to adjust the frequency or voltage limits at which these rates shall become active;

1. to be configured to measure the frequency of the mains grid accurately;
2. to be configured to measure the voltage of the mains grid accurately;
3. to be configured to measure the power consumption of the electrical load of the device so that the capacity for change in the load demand can be reported to the virtual load manager;
4. to be capable of using the measured data along with the configuration settings from the VLM to calculate the increase or decrease of power required to stabilize the grid circuit to which it is attached and
5. to be configured to increase and reduce the power consumption of the electrical load of the device accurately.

Once the local controller can satisfy the above requirements, it is suitable as a base for developing a software algorithm that allows the virtual load manager (VLM) to manage the grid based on the settings assigned by the CGC.

Figure 1:
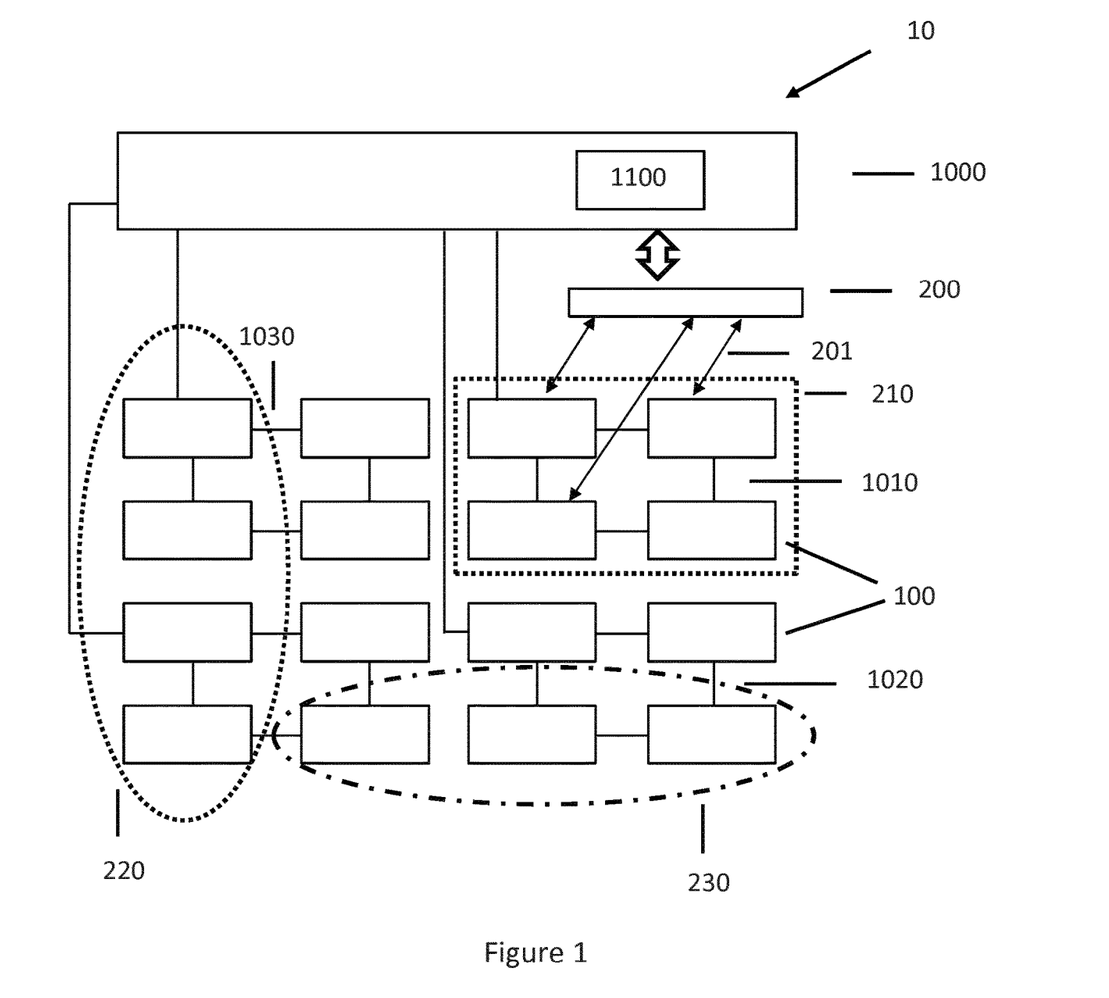
FIG. 1 is a block diagram illustrating an overall power grid stability management system utilising local dynamic load control, according to an embodiment of the present disclosure.

FIG. 1 is a diagram illustrating a system 10 for controlling power grid stability utilising local dynamic load control, according to an embodiment of the present disclosure. Referring to FIG. 1, the system 10 comprises a plurality of individual electrical devices 100 connected to a mains supply grid 1000. The electrical devices 100 may be streetlights for example. The electrical devices 100 may be part of one of more different grid circuits 1010, 1020, and 1030 connected to the mains supply grid 1000. For example, many of these grid circuits 1010, 1020, and 1030 may be supplied from different sub stations within the mains supply grid 1000. The individual grid circuits 1010, 1020, and 1030 may require different dynamic load response profiles based on the individual circuit requirements. Referring again to FIG. 1, the system 10 includes a virtual load manager (VLM) 200. The virtual load manager (VLM) 200 comprises one or more processors and is configured to provide and communicate different configurations to the plurality of individual electrical devices 100 so that those with the same configuration parameters may act as one or more virtual load groups 210, 220, 230. The virtual load manager (VLM) 200 is configured to manage the operating characteristics of each of the one or more virtual load groups 210, 220, 230 on behalf of a CGC 1100 of the mains supply grid 1000. One of the key functions of the virtual load manager (VLM) 200 is to connect to and identify electrical devices 100 that are suitable for grouping together as virtual load groups 210, 220, 230. In this regard, the virtual load manager (VLM) 200 analyses data from all the monitored individual electrical devices 100 to identify the different grid circuits 1010, 1020, 1030. Analysing data from all the monitored individual electrical devices 100 comprises monitoring the supply voltage and grid frequency for each electrical device 100. Based on this analysis, the virtual load controller 200 can configure each of the electrical devices 100 that are part of the same grid circuit 1010, 1020, 1030 so they act in the same fashion and as a result effectively provide a respective virtual load group 210, 220, 230.

It has been described above in one embodiment that the virtual load controller 200 can configure electrical devices 100 that are part of the same grid circuit 1010, 1020, 1030 in respective virtual load groups 210, 220, 230. Other strategies for configuring the individual electrical devices 100 to act together as virtual load groups can be employed, according to embodiments of the present disclosure. For example, one or more of the virtual load groups 210, 220, 230 of electrical devices 100 may be configured to react at the same speed to the same frequency fluctuations on the grid. In another embodiment, one or more of the virtual load groups 210, 220, 230 of electrical devices 100 may be configured to react at the same speed to the same voltage fluctuations on the grid. Further virtual load groupings may be defined where multiples of electrical devices are configured to react to the same disturbance levels at different rates of load power change. In this way, virtual load groups of fast acting and slower acting dynamic loads may be managed by the virtual load manager (VLM) 200 to satisfy the requirements of the CGC 1100.

Referring to FIG. 1, the virtual load manager (VLM) 200 is configured for communication with the CGC 1100, the electrical devices 100 and other devices, machines and/or elements. A detailed description of the virtual load manager (VLM) 200 is provided below.

The virtual load manager (VLM) 200 is configured to provide the correct configurations to the individual electrical devices 100 so that they adjust the load power consumed by each device to act as one or more virtual load groups 210, 220, 230 based on the measured frequency and/or voltage of the mains supply grid 1000 to help return the mains supply grid 1000 to a stable state. The frequency of the mains supply grid 1000 is measured locally at each of the electrical devices 100.

The virtual load manager (VLM) 200 is configured to receive the required response profile as required from the CGC 1100, for dynamic control response, and calculate and transmit the configuration settings to all the electrical devices 100.

Multiple configurations may be calculated based on the grid management requirements, i.e. fast reacting response, slow reacting response, response based on frequency fluctuations, response based on voltage fluctuations, etc. The virtual load manager (VLM) 200 is also configured to collate and aggregate data from each individual electrical device 100 in order to define the load capacity and dynamic load change capability of each of the individual electrical devices 100. In this manner, the virtual load manager (VLM) 200 can calculate the capability of the multiples of electrical devices 100 that react identically to provide information on the one or more virtual load groups 210, 220, 230 and provide the aggregate data back to the CGC 1100. The aggregate data from the individual electrical devices 100 may be used to generate the present load, power consumption, maximum available load, minimum available load and current response settings of each of the one or more virtual load groups 210, 220, 230 or individual electrical devices 100 themselves. The virtual load manager (VLM) 200 may be configured to create and issue revised device configurations to each electrical device 100 thus allowing decreased demand from the one or more virtual load groups 210, 220, 230 or individual electrical devices 100 if grid supply capability of the grid is determined to be below a predetermined limit. The virtual load manager 200 may be configured to create and issue revised device configurations to each electrical device 100 thus allowing increased demand from the one or more virtual load groups 210, 220, 230 or individual electrical devices 100 if grid supply capability of the grid is determined to be above a predetermined limit. The predetermined limit may be imposed on the VLM 200 by the CGC 1100 according to requirements. Revised configurations can be sent to the individual electrical devices 100 so that they react to satisfy the new requirements as defined by the CGC 1100.

Figure 2:
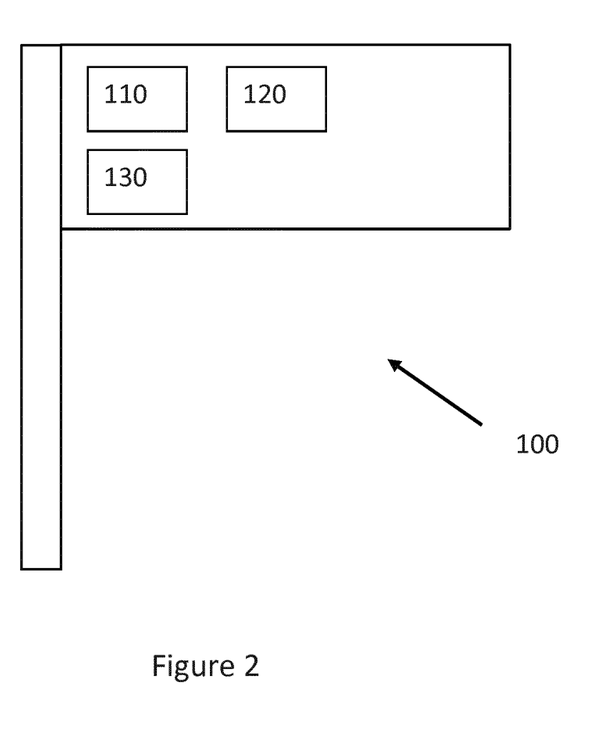
FIG. 2 is a block diagram illustrating the structure of an electrical device such as a streetlight comprising a local controller, according to an embodiment of the present disclosure.

FIG. 2 is a block diagram illustrating the structure of an electrical device 100 such as a streetlight comprising a local controller 110, according to an embodiment of the present disclosure. Referring to FIG. 2, the electrical device 100 comprises a local controller 110, a communication interface 120, and a grid frequency measuring device 130 connected to each other. The local controller 110 may be configured to measure the power consumption of the electrical load of the device so that the effect of a change in the load can be predicted by the CGC; and to be configured to increase and reduce the power consumption of the electrical load of the device accurately.

The communication interface 120 may be any interface that enables communication between the electrical device 100 and other devices, machines and/or elements, such as the CGC 1100. The communication interface 120 is configured for transmitting and/or receiving data. For example, the communication interface 120 may include but is not limited to a cellular transceiver, a satellite communication transmitter/receiver and/or any other such interfaces for wired or wirelessly connecting the virtual load manager (VLM) 200 to the CGC 1100. The communication interface 120 may be configured for two-way communications to allow near instant updates from the CGC 1100 to the virtual load manager (VLM) 200, to adjust the rate or rates at which the electrical device 100 is allowed to increase or decrease the power demand from the grid and to adjust the frequencies at which these rates shall become active. The grid frequency measuring device 130 is configured to measure the frequency of the mains grid accurately. By measuring the power grid frequency directly at the electrical device 100, the load adjustment level can be communicated to the local controller 110 quickly.

According to another embodiment of the present disclosure, each of the one or more individual electrical devices 100 may be assigned a minimum power level, or safety value. The safety value may be assigned based on the usage and application of the one or more electrical devices 100. The safety value may be assigned independent of dynamic load control on the device. For example, where the electrical devices 100 are streetlights, the lighting level may be configured not to be reduced below 50% during rush hour even if the grid needs to reduce power consumption to regain stability. Where the electrical devices 100 are room heaters, the room heaters may be configured so that the room temperature is not allowed to exceed 28 degrees Celsius even if the grid needs to increase power consumption to regain stability.

Figure 3:
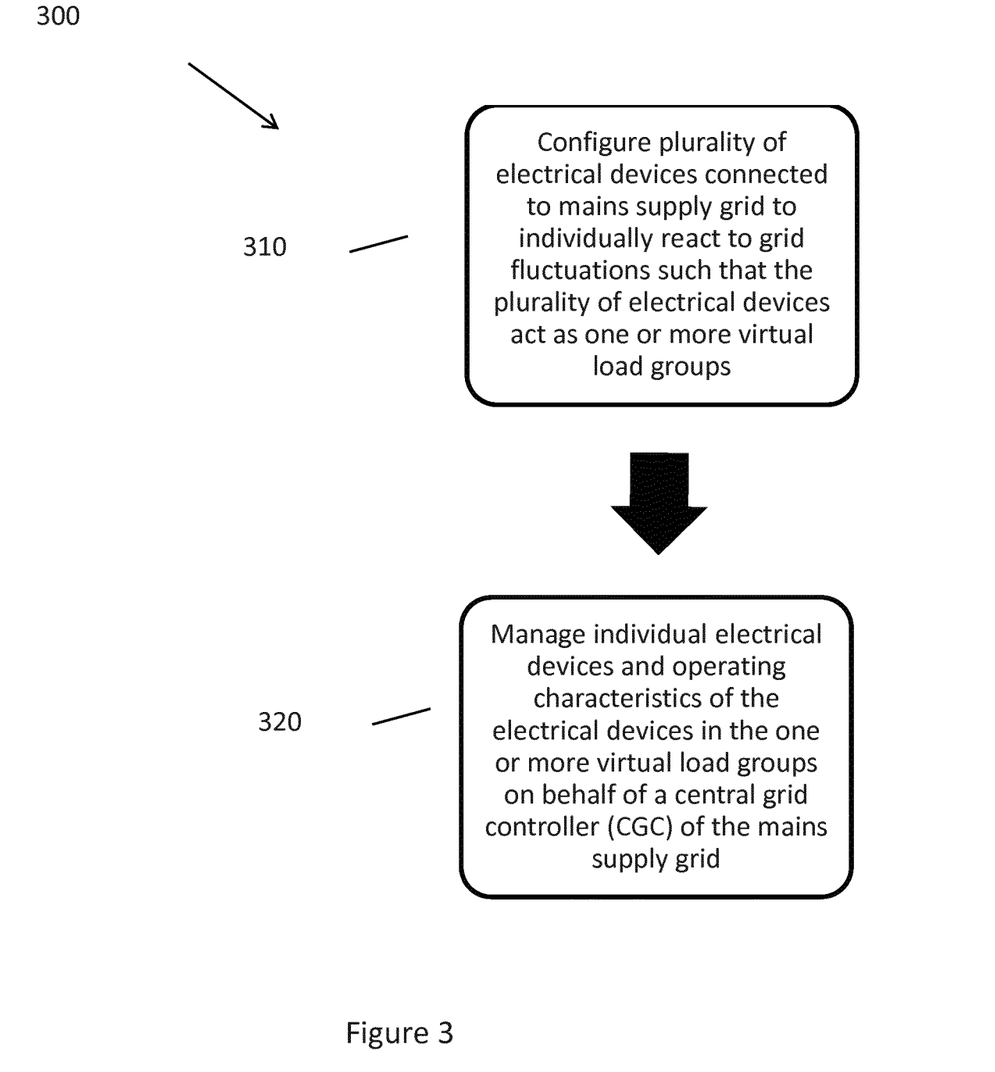
FIG. 3 is a flowchart illustrating a method for managing power grid stability utilising local dynamic load control, according to an embodiment of the present disclosure.

FIG. 3 is a flowchart illustrating a method 300 for managing power grid stability utilising local dynamic load control, according to an embodiment of the present disclosure. Referring to FIG. 3, the method 300 includes configuring a plurality of electrical devices connected to a mains supply grid to individually react to grid fluctuations such that the plurality of electrical devices act as one or more virtual load groups each comprising one or more electrical devices with the same response to the grid fluctuations 310, and managing the individual electrical devices and operating characteristics of the electrical devices in the one or more virtual load groups on behalf of a central grid controller (CGC) of the mains supply grid 320. As mentioned above, each of the electrical devices comprises a local controller configured to provide dynamic control of their respective load in response to fluctuations of the mains supply grid based on the configuration provided by the virtual load manager (VLM).

The present disclosure provides for the practical control of large quantities of individually small dynamic loads for power grid stability management. The method and system of the present disclosure may be applied for a wide range of electrical appliances other than street lighting where large numbers of relatively small individual loads are available for dynamic load control to allow them to be used effectively for grid stability management. In some instances, the value for the utility providing the grid power may be savings of a 20 MW high speed generator. From the point of view of the owner of the plurality of electrical appliances, such as streetlights, where it is not the power grid utility, there will most likely be preferential charge rates where the owner allows the utility control over the electrical appliances for grid management.

Figure 4:
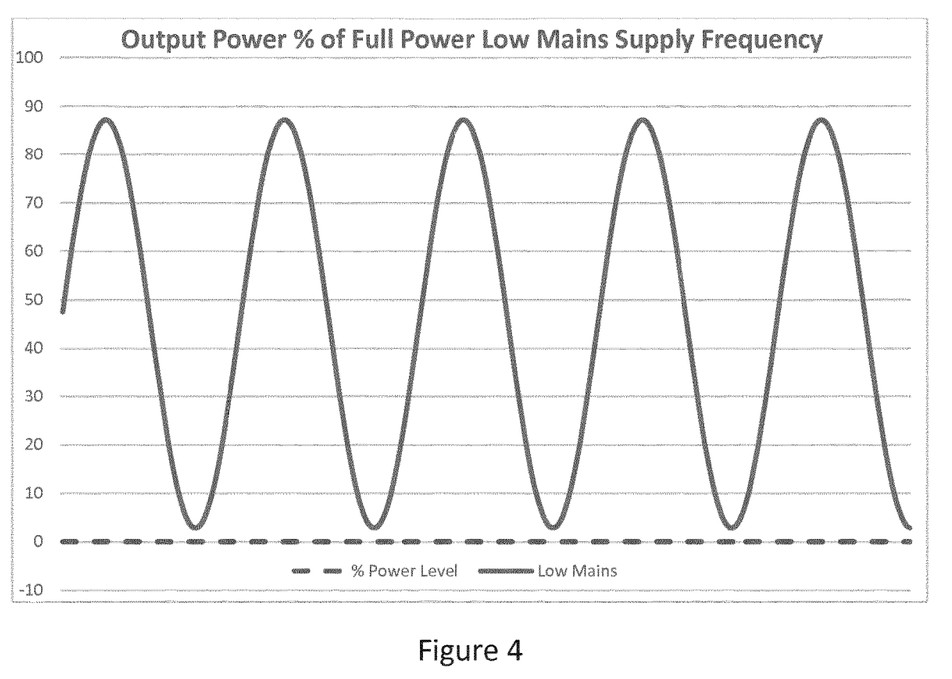
FIG. 4 is a graph illustrating output power of a dynamic load device as a percentage of full power in relation to mains supply frequency.

FIG. 4 is a graph illustrating output power as a percentage of full power in relation to mains supply frequency. Referring to FIG. 4, output power of a dynamic load device is set to zero when the mains frequency is detected to be in a critically low condition.

Figure 5:
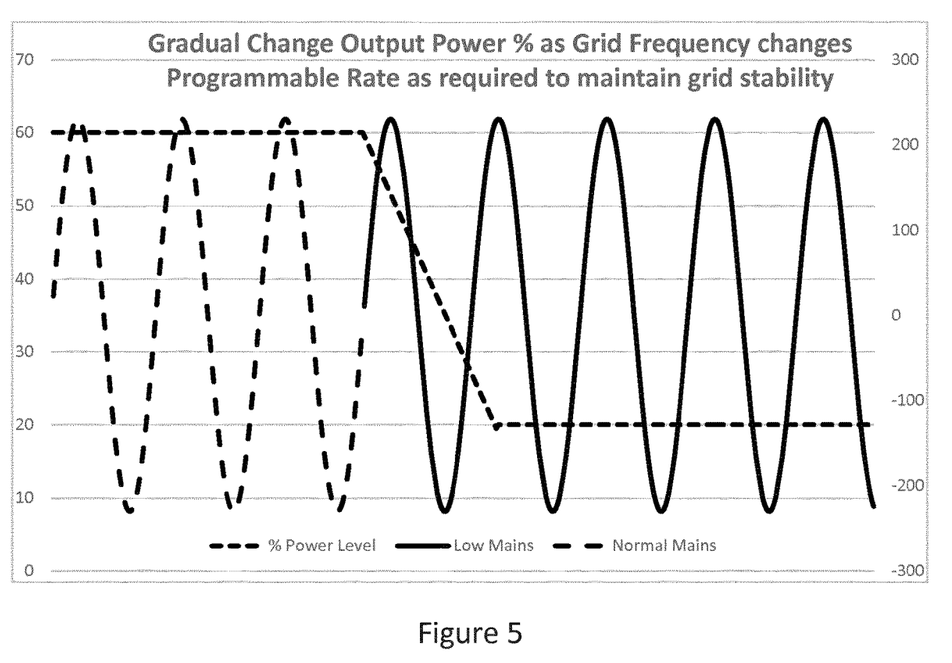
FIG. 5 is a graph illustrating output power of a dynamic load device reduced from 60% down to 20% gradually when the mains supply frequency is detected to have changed from a normal to a low condition.

FIG. 5 is a graph illustrating output power of a dynamic load device reduced from 60% down to 20% gradually when the mains supply frequency is detected to have changed from a normal to a low condition. The rate at which the load can be changed is configurable as required to maintain grid stability.

Figure 6:
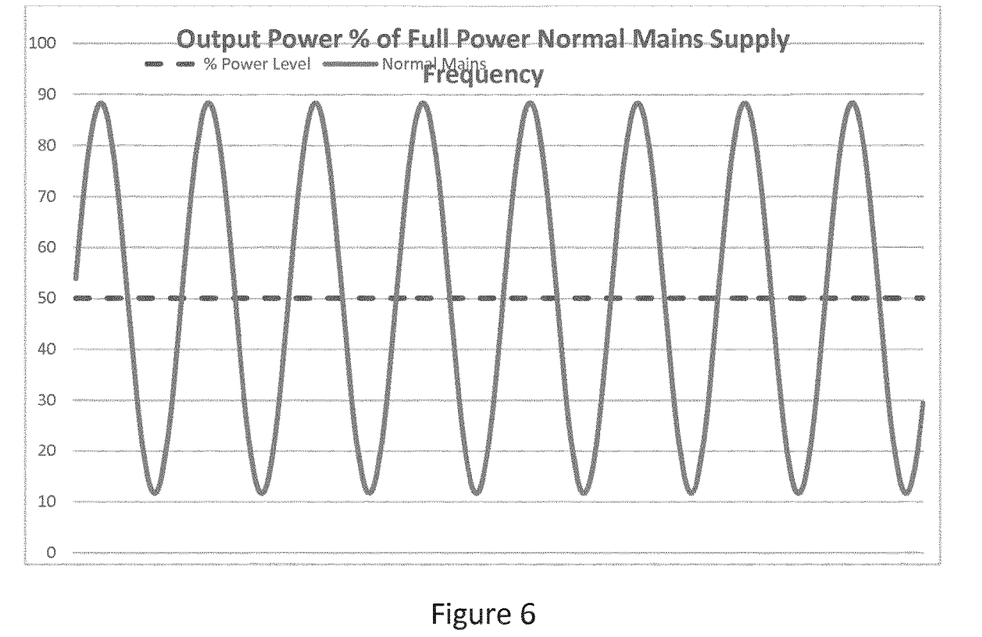
FIG. 6 is a graph illustrating output power of a dynamic load device set to 50% output when the mains supply frequency is detected to be in a normal condition.

FIG. 6 is a graph illustrating output power of a dynamic load device set to 50% output when the mains supply frequency is detected to be in a normal condition.

Figure 7:
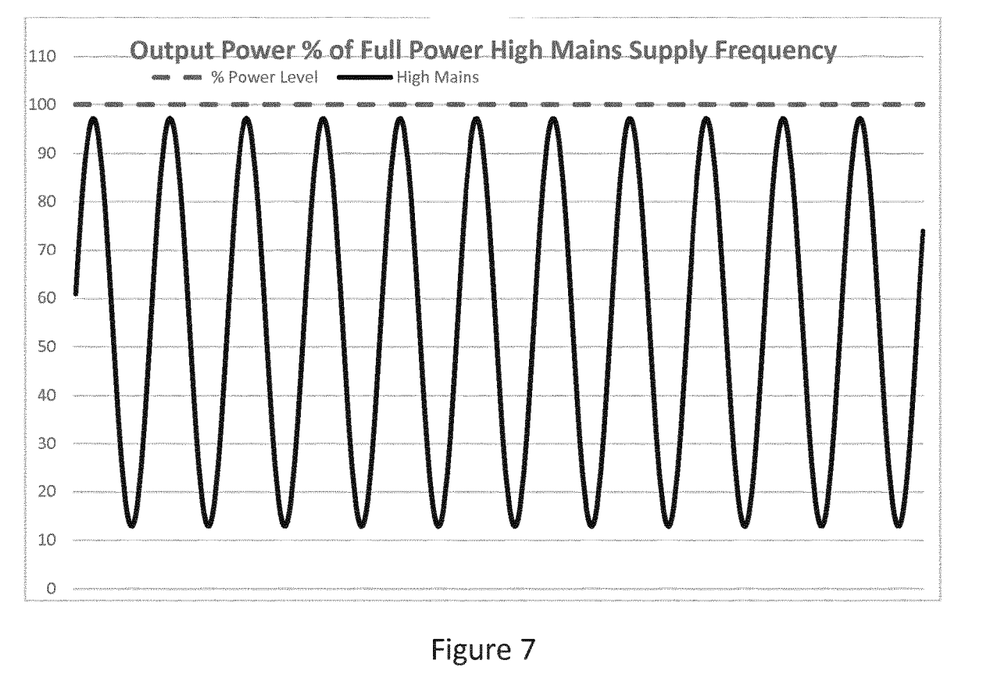
FIG. 7 is a graph illustrating output power of a dynamic load device set to full output when the mains supply frequency is detected to be in a critically high condition.

FIG. 7 is a graph illustrating output power of a dynamic load device set to full output when the mains supply frequency is detected to be in a critically high condition.

Figure 8:
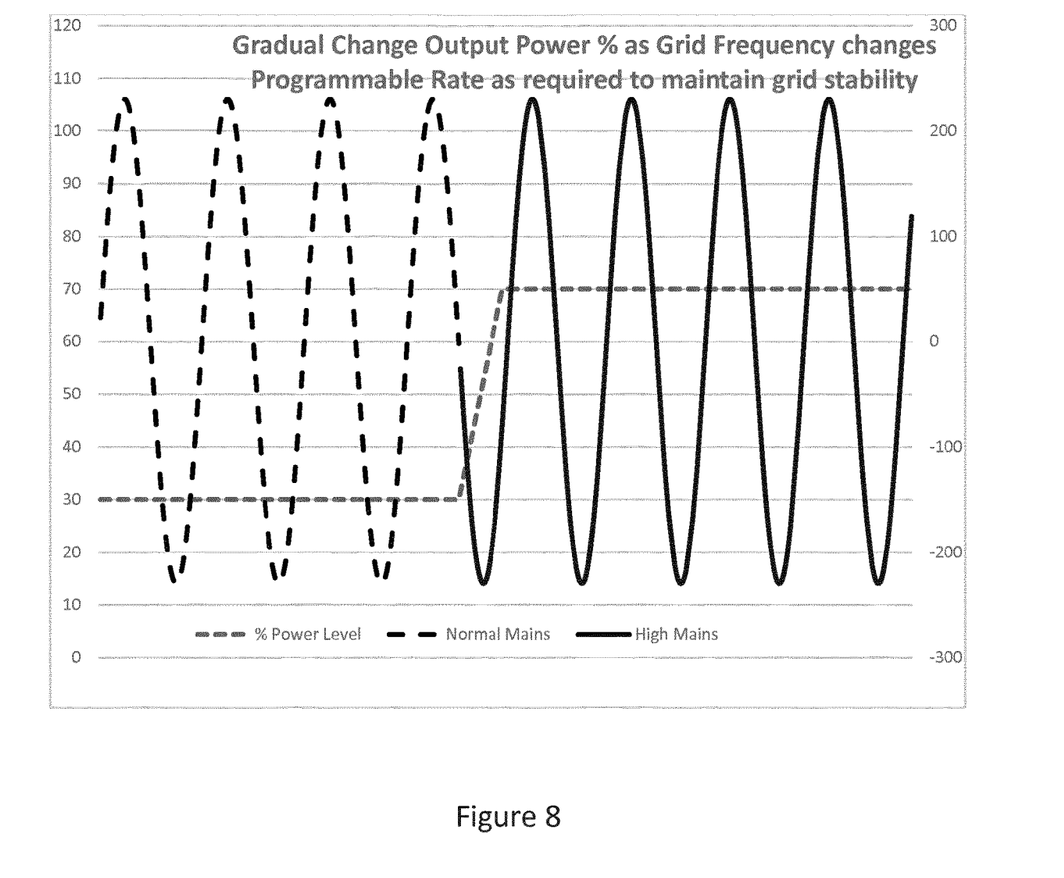
FIG. 8 is a graph illustrating output power of a dynamic load device increased from 30% up to 70% gradually when the mains supply frequency is detected to have changed from a normal to a high condition.

FIG. 8 is a graph illustrating output power of a dynamic load device increased from 30% up to 70% gradually when the mains supply frequency is detected to have changed from a normal to a high condition. The rate at which the load can be changed is configurable as required to maintain grid stability.

The present disclosure provides a configuration whereby individual electrical devices control themselves independently based on a configuration set by a virtual load manager. The "virtual" groupings are based on individual devices being configured to react in the same way to the same grid fluctuations. As the virtual load manager sets the configurations on each device, it can keep track of the number of individual devices that have the same configuration and therefore predict the reaction of the sum of the individual electrical devices to particular disturbances on the grid.

Figure 9:
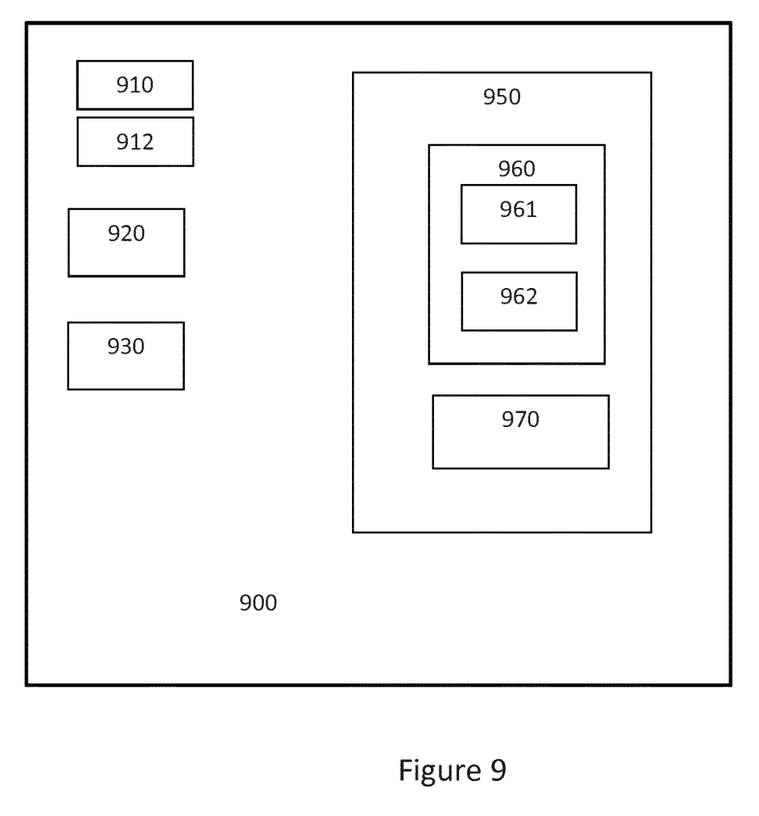
FIG. 9 is a block diagram illustrating a configuration of a virtual load manager (VLM) including various hardware and software components that function to perform the methods according to embodiments of the present disclosure.

FIG. 9 is a block diagram illustrating a configuration of a virtual load controller 900 according to an embodiment of the present disclosure. The virtual load controller 900 corresponds to the virtual load manager (VLM) 200 described previously. The virtual load manager (VLM) 900 includes various hardware and software components that function to perform the processing steps according to the present disclosure. The virtual load manager (VLM) 900 may be embodied as one of numerous general purpose or special purpose computing system environments or configurations. Examples of well-known computing systems, environments, and/or configurations that may be suitable for use with the present disclosure include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

Referring to FIG. 9, the virtual load manager (VLM) 900 comprises a user interface 910, a processor 920 in communication with a memory 950, and a communication interface 930. The processor 920 functions to execute software instructions that can be loaded and stored in the memory 950. The processor 920 may include a number of processors, a multi-processor core, or some other type of processor, depending on the particular implementation. The memory 950 may be accessible by the processor 920, thereby enabling the processor 920 to receive and execute instructions stored on the memory 950. The memory 950 may be, for example, a random access memory (RAM) or any other suitable volatile or non-volatile computer readable storage medium. In addition, the memory 950 may be fixed or removable and may contain one or more components or devices such as a hard drive, a flash memory, a rewritable optical disk, a rewritable magnetic tape, or some combination of the above.

One or more software modules 960 may be encoded in the memory 950. The software modules 960 may comprise one or more software programs or applications having computer program code or a set of instructions configured to be executed by the processor 920. Such computer program code or instructions for carrying out operations for aspects of the systems and methods disclosed herein may be written in any combination of one or more programming languages.

The software modules 960 may include at least a first application 961 and a second application 962 configured to be executed by the processor 920. During execution of the software modules 960, the processor 920 configures the virtual load manager (VLM) 900 to perform various operations relating to the algorithms according to embodiments of the present disclosure, as has been described above.

Other information and/or data relevant to the operation of the present systems and methods, such as a database 970, may also be stored on the memory 950. The database 970 may contain and/or maintain various data items and elements that are utilized throughout the various operations of the system described above. It should be noted that although the database 970 is depicted as being configured locally to the virtual load manager (VLM) 900, in certain implementations the database 970 and/or various other data elements stored therein may be located remotely. Such elements may be located on a remote device or server—not shown, and connected to the virtual load manager (VLM) 900 through a network in a manner known to those skilled in the art, in order to be loaded into a processor and executed.

Further, the program code of the software modules 960 and one or more computer readable storage devices (such as the memory 950) form a computer program product that may be manufactured and/or distributed in accordance with the present disclosure, as is known to those of skill in the art.

The communication interface 930 is also operatively connected to the processor 920 and may be any interface that enables communication between the virtual load manager (VLM) 900 and other devices, machines and/or elements, such as the CGC. The communication interface 930 is configured for transmitting and/or receiving data. For example, the communication interface 930 may include but is not limited to a Bluetooth, or cellular transceiver, a satellite communication transmitter/receiver, an optical port and/or any other such, interfaces for wirelessly connecting the virtual load manager (VLM) 900 to the other devices.

The user interface 910 is also operatively connected to the processor 920. The user interface may comprise one or more input device(s) such as switch(es), button(s), key(s), and a touchscreen.

The user interface 910 functions to allow the entry of certain information about the image template and preferred options as discussed above. The user interface 910 functions to facilitate the capture of commands from the user such as an on-off commands or settings related to operation of the system described above.

A display 912 may also be operatively connected to the processor 920. The display 912 may include a screen or any other such presentation device that enables the user to view various options, parameters, and results. The display 912 may be a digital display such as an LED display. The user interface 910 and the display 912 may be integrated into a touch screen display.

The virtual load manager (VLM) 900 may also reside on a remote cloud-based computer. Accordingly, the software adapted to implement the system and methods of the present disclosure can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualised resources. Cloud computing providers deliver applications via the internet, which can be accessed from a web browser, while the business software and data are stored on servers at a remote location.

In the cloud embodiment of the virtual load manager (VLM) 900, the software modules 960 and processor 920 may be remotely located on the cloud-based computer, while the remaining componentry of the virtual load manager (VLM) 900 may comprise a local data collection device to collect data from the plurality of individual electrical devices 100.

The operation of the virtual load manager (VLM) 900 and the various elements and components described above will be understood by those skilled in the art with reference to the method and system according to the present disclosure.

The words comprises/comprising when used in this specification are to specify the presence of stated features, integers, steps or components but does not preclude the presence or addition of one or more other features, integers, steps, components or groups thereof.

The invention claimed is:

1. A method for managing power grid stability utilizing local dynamic load control, the method being performed by a virtual load manager (VLM) comprising one or more processors configured to:
configure a plurality of electrical devices connected to a mains supply grid to individually react to grid fluctuations such that the plurality of electrical devices act as one or more virtual load groups each comprising one or more electrical devices with a same response to the grid fluctuations; and manage individual electrical devices and operating characteristics of the individual electrical devices in the one or more virtual load groups on behalf of a central grid controller (CGC) of the mains supply grid, wherein each of the electrical devices comprises a local controller configured to:

provide dynamic control of their respective load in response to fluctuations of the mains supply grid based on the configuration provided by the virtual load manager (VLM);

communicate with the virtual load manager;

adjust a rate at which a device is allowed to increase or decrease power demand from the mains supply grid and to adjust frequency and voltage limits at which the rate becomes active;

measure a frequency of the mains supply grid;

measure a voltage of the mains supply grid;

measure power consumption of an electrical load of the device; and adjust the power consumption of the electrical load of the device.

2. The method of claim 1, wherein the operating characteristics comprise the frequency of the mains supply grid.

3. The method of claim 1, wherein the operating characteristics comprise the voltage of the mains supply grid.

4. The method of claim 1, comprising determining a present frequency of the mains supply grid.

5. The method of claim 4, wherein the present frequency of the mains supply grid is measured by the local controller of each of the electrical devices.

6. The method of claim 4, comprising comparing the determined present frequency against frequency limits and configuration set by the virtual load manager.

7. The method of claim 4, comprising adjusting power consumed by each of the one or more of the individual electrical devices based on the determined present frequency to help return the mains supply grid to a stable state.

8. The method of claim 1, comprising determining a present voltage of the mains supply grid.

9. The method of claim 8, wherein the present voltage of the mains supply grid is measured by the local controller of each of the electrical devices.

10. The method of claim 8, comprising comparing the determined present voltage against voltage limits and configuration set by the virtual load manager.

11. The method of claim 8, comprising adjusting power consumed by each of the one or more of the individual electrical devices based on the determined present voltage to help return the mains supply grid to a stable state.

12. The method of claim 1, comprising grouping electrical devices in the one or more virtual load groups by analysing data from the individual electrical devices to identify different grid circuits to which they are connected.

13. The method of claim 12, comprising monitoring supply voltage and grid frequency for each electrical device to identify which grid circuit each electrical device is connected to.

14. The method of claim 13, comprising providing a common configuration for devices that are part of a same grid circuit to act as a virtual load group.

15. The method of claim 1, comprising grouping electrical devices in the one or more virtual load groups by determining electrical devices which react at a same speed to fluctuations of a same frequency on the mains supply grid.

16. The method of claim 1, comprising grouping electrical devices in the one or more virtual load groups by determining electrical devices which react at a same speed to fluctuations of a same voltage on the mains supply grid.

17. The method of claim 1, comprising grouping electrical devices in the one or more virtual load groups by determining electrical devices which react to same disturbance levels at different rates of load power change.

18. The method of claim 1, comprising transmitting configuration settings as required from the virtual load manager, for dynamic control response, to all the individual electrical devices.

19. The method of claim 1, comprising providing by the virtual load manager to the CGC a present state of a virtual load, power consumption, maximum available load, minimum available load and current response settings of each of the one or more virtual load groups or individual electrical devices to system requirements.

20. The method of claim 19, comprising configuring the individual electrical devices to decrease demand if grid supply capability of the mains supply grid is determined to be below a predetermined limit.

21. The method of claim 19, comprising configuring the individual electrical devices to increase demand if grid supply capability of the mains supply grid is determined to be above a predetermined limit.

22. The method of claim 1, comprising assigning each of the one or more electrical devices a safety value based on usage and application of each device independent of dynamic load control on each device.

23. A system for controlling power grid stability utilizing local dynamic load control, the system comprising:

a plurality of electrical devices connected to a mains supply grid;

a central grid controller (CGC) of the mains supply grid;

a virtual load manager (VLM) comprising one or more processors configured to:

configure the plurality of electrical devices connected to the mains supply grid to individually react to grid fluctuations such that the plurality of electrical devices act as one or more virtual load groups each comprising one or more electrical devices with a same response to the grid fluctuations; and manage individual electrical devices and operating characteristics of the electrical devices in the one or more virtual load groups on behalf of the CGC of the mains supply grid, wherein each of the electrical devices comprises a local controller configured to provide dynamic control of their respective load in response to fluctuations of the mains supply grid based on the configuration provided by the virtual load manager, wherein the local controller of each of the electrical devices is configured to:

communicate with the virtual load manager;

adjust a rate at which the respective device is allowed to increase or decrease power demand from the mains supply grid and to adjust frequency and voltage limits at which these rates become active;

measure a frequency of the mains supply grid:

measure a voltage of the mains supply grid;

measure power consumption of an electrical load of the respective device; and adjust the power consumption of the electrical load of the respective device.

24. The system of claim 23, wherein the virtual load manager resides on a cloud based computer.

25. The system of claim 23, wherein the VLM is configured to perform a method for managing power grid stability utilising local dynamic load control, the method being performed by the one or more processors of the VLM, the one or more processors being configured to:
- configure the plurality of electrical devices connected to the mains supply grid to individually react to grid fluctuations such that the plurality of electrical devices act as one or more virtual load groups each comprising one or more electrical devices with the same response to the grid fluctuations; and
- manage the individual electrical devices and operating characteristics of the electrical devices in the one or more virtual load groups on behalf of the CGC of the mains supply grid,
- wherein each of the electrical devices comprises a local controller configured to provide dynamic control of their respective load in response to fluctuations of the mains supply grid based on the configuration provided by the VLM.

* * * * *